July 31, 1951     T. W. ZOBEL     2,562,227
FLOW PROFILE FOR REDUCED DRAG

Filed July 9, 1947     3 Sheets-Sheet 1

INVENTOR.
THEODOR W. ZOBEL
BY Wade Koontz
ATTORNEY
H. N. Losch and
AGENT

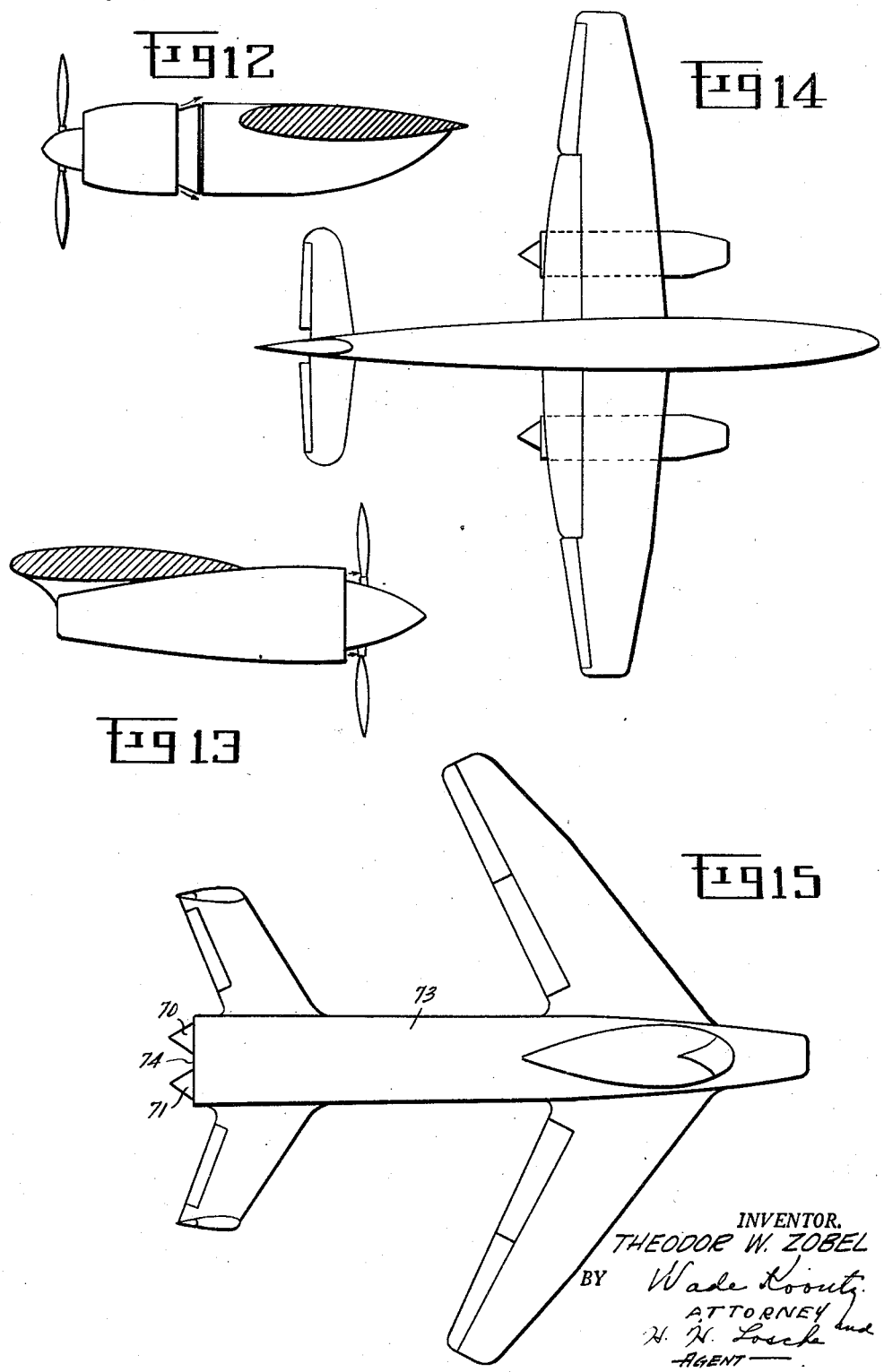

# UNITED STATES PATENT OFFICE 2,562,227

FLOW PROFILE FOR REDUCED DRAG

Theodor Wilhelm Zobel, Braunschweig-Lehndorf, Germany

Application July 9, 1947, Serial No. 759,897

6 Claims. (Cl. 244—35)

(Granted under the act of March 3, 1883, as amended April 30, 1928; 370 O. G. 757)

The invention described herein may be manufactured and used by or for the Government for governmental purposes without payment to me of any royalty thereon.

This invention relates to the flow profiles of minimum drag capable of establishing good flow characteristics in all subsonic and transonic speeds and which profiles are made adaptable for supersonic speeds in flight.

Flow profiles offering the least possible drag have become of increasing importance as progress is made in the development of faster planes having greater range. The physical appearance of a reduced drag profile which determine its characteristic of resistance to flow, especially at high speeds, may vary considerably from those of the conventional profile.

Observing the horizontal forces which act on a profile on a high speed flow, it is noted that total drag in the range of normal speeds increase steadily with increasing speed. When speed is increased up to substantial compressible flow in the subsonic region, total drag rapidly increases to very high values. The greatest part of this sudden increase in the total drag is due to flow processes that take place on the rear portion of the profile. This is the section of the profile behind the thickest part of the chord where a very thick boundary layer forms as soon as local flows in the front portion of the profile attain the speed of sound, and a shock wave will be formed in this region.

Experience shows that reduced drag profiles for speeds in the substantially incompressible flow regions are shaped so that the thickest point is far back on the chord. Profiles having the point of greatest thickness at 60 per cent of the chord are chosen in the development of laminar profiles. In this manner a long laminar boundary layer is created and the transition point from laminar to turbulent boundary layer flow lies far back on the chord. Profiles of this kind have very little drag when their angle of attack is close to zero, flow velocity is low, and their surfaces are carefully smoothed. Thus, little total drag is present due to reduced form drag. These profiles are very sensitive to the smallest disturbances in the flow which can be effected by minute changes in their surface. The result of such disturbances is immediate transition from laminar to turbulent boundary layer and a shift in the transition point to a place farther forward on the chord. This increases drag due to pressure distribution and, therefore, total drag. Greater disturbance effects appear in the boundary layer at greater flow speeds. The appearance of shock waves and local flows having the speed of sound effects complete separation of the flow from the tapering part of the profile and, therefore, a decisive increase in drag.

The separation of the flow caused by shock waves on the surface of the profile is not the only cause of increased drag. When speeds are increased further, cases occur in which the shock waves no longer appear on the surface of the profile but behind it. At this point the flow on the whole surface is supersonic, and the low pressure points of the pressure distribution are located near the end of the profile. Then, because of higher speeds on the profile, the boundary layer is stable and does not separate from the surface of the airfoil. The large amount of drag which is also present in this flow range consists almost exclusively of drag due to pressure distribution. This drag originates on the tapering portion of the profile behind the thickest part of the chord.

The present invention presents a number of reduced drag profiles for both high and normal speeds by giving the greater part of the profile a laminar surface only. This is accomplished by cutting off a normal profile in the region near its larger thickness and to move the greatest thickness to the rear. The whole length of the chord is curved in such a manner that static pressure exerts a horizontal component forward at every point on the surface of the profile. This component acts in the opposite direction of the flow and reduces drag. An accelerated flow is present on the whole surface of the profile. The boundary layer of this whole region is laminar if the surface of the airfoil is reasonably smooth.

The drag of profile forms cut off at their thickest point is still greater than that desirable for these profiles. This invention further anticipates means for overcoming this disadvantage, which can be achieved by means of various methods, one of them being to influence the wake behind the blunt back end of the profile by adding a suitably shaped extension to the profile. This decreases the form drag.

A much more effective means of attaining a reduction in drag is by inducing flow energy into the wake. This is accomplished by conducting air or some other vapor or gas-like substance through the profile and blowing it out at the trailing end. The air intake is best located at the ram point but can be located elsewhere.

The most complete way of reducing drag for the present invention is by applying this invention to radially symmetric bodies or fuselages having variously shaped cross sections and blowing air with full force out of the total area at the back end of the body. This is the case in radially symmetric or bodies having other shapes powered by thrust producing engines. For instance, the fuselage of a plane can be constructed in accordance with this invention such that the jet of its thrust engine or engines is blown out at the tail. In this manner reduced drag conditions are attained with the fuselage and the effectiveness of the empennage is increased. In addition to this it is advantageous to locate the exhaust at the tail end of the fuselage due to the effects of heat and flame.

It is a primary object of this invention to provide reduced drag profiles that in principle are as suitable for supersonic flight as for subsonic flight.

It is another object of this invention to provide reduced drag profile forms for influencing the wake to decrease drag at subsonic and supersonic speeds.

It is a further object of this invention to provide reduced drag profiles in which air or gaseous substance is issued under pressure into the turbulent wake area.

It is still another object of this invention to provide a reduced drag profile having a gradually divergent surface for laminar flow ending in a sharp trailing edge at which point flow energy joins the laminar flow to stabilize the turbulent wake within the area behind the trailing edge.

It is a still further object of this invention to provide a reduced drag profile having a retractible spear-like or knife-like leading edge portion and a gradually divergent laminar flow surface which ends in a sharp trailing edge, and means to issue flow energy through ducts at the end of the laminar surface into the region adjacent to the trailing edge.

These and other objects and advantages will become more apparent as the description proceeds when taken in conjunction with the accompanying drawings, in which.

Figs. 7, 8, 9, 10, and 11 show cross-sectional views of profiles corresponding to the profiles of Figs. 2, 3, 4, 5, and 6, respectively, in which a passage or duct means is shown for introducing flow energy into the wake of the profile;

Fig. 12 shows the conventional power plant suspension on the airfoil with the airfoil in cross-section;

Fig. 13 shows the power plant mounting more in accordance with this invention to reduce drag, the airfoil being shown cross-sectioned;

Fig. 14 shows a conventional modern war plane; and

Fig. 15 shows a war plane with thrust producing power plants provided to issue flow energy out the complete cross section fuselage training end incorporating the concepts of this invention.

Figure 1:
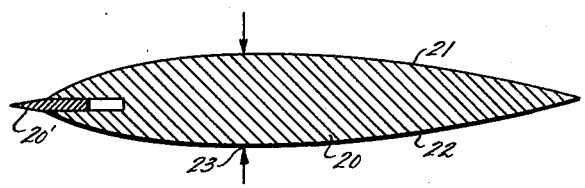
Fig. 1 is a cross-sectional view of a normal profile.
Figure 2:
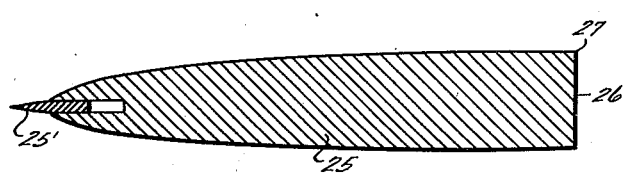
Fig. 2 is a cross-sectional view of the normal profile cut off at its thickest point in accordance with this invention.
Figure 5:
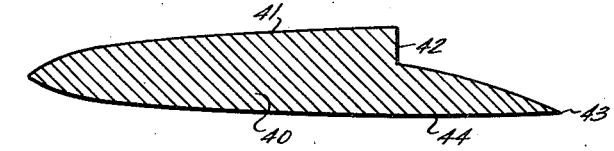
Fig. 5 shows a cross-sectional view of another modification of profile having the upper laminar surface cut away at the thickest portion to form a step.
Figure 6:
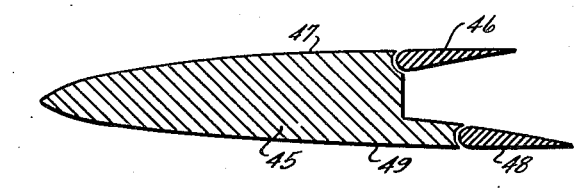
Fig. 6 shows a cross-sectional view of another modification of profile in which an adjustable flap is mounted at the trailing edge of the upper and lower staggered laminar surfaces to control flow characteristics.

Referring to Figs. 1 to 6, inclusive, a profile 20 shown in Fig. 1 is of the conventional type for normal subsonic speeds which develops a considerable amount of drag at high substantially compressible flow speeds by reason of turbulence produced on the trailing portions 21 and 22 which are behind the thickest portion 23 of the chord. In accordance with this invention the drag of this profile may be reduced by the cutting off a normal profile, as at 23, at its thickest point in which only laminar surfaces are effective. Such a construction is shown in Fig. 2 in which the profile 25 terminates in a flat trailing portion 26 at a point 27 of largest profile thickness. While the drag is greatly reduced the drag may still further be reduced by adding a suitably shaped extension on the profile as shown by 30 in Fig. 3, which reduces pressure drag, or the trailing portion may be recessed as shown at 35 in Fig. 4 and a small profile 36, shown in broken lines, may be placed in the suction area to stabilize the wake. It may be noted in Fig. 4 that the flow surfaces 37 and 38 permit laminar flow to the trailing edges which are in the region of the thickest part of the chord. Fig. 5 shows a profile 40 for high air speeds in which the upper surface 41 is cut perpendicular to the low air density side of the profile to form a step 42 that terminates in a sharp trailing edge 43 with a lower laminar surface 44. In Fig. 6 the profile 45 has two laminar flows, one on the pressure side and one on the suction side, each of which merge into a trailing edge. A flap 46 is on the trailing edge of the upper laminar surface 47 and a flap 48 is on a trailing edge of the lower laminar surface 49. The flaps 46 and 48 are individually adjustable. The trailing edges are staggered to avoid aerodynamic interference.

By inducting flow energy into the area following the laminar surfaces of the profiles shown in Figs. 2 to 6 the formation of a wake can be stabilized and consequently the drag will be further reduced. Figs. 7, 8, 9, 10, and 11 show profiles having flow energy ducts as they would be positioned in the profiles of Figs. 2 to 6, respectively.

Figure 7:
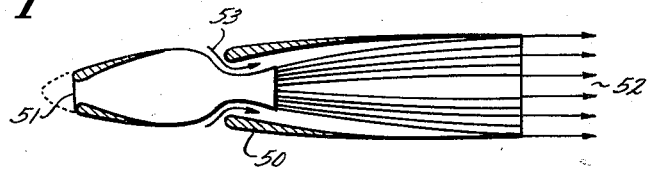

In Fig. 7 the profile 50 has an air intake 51 which receives atmospheric air that is conducted by a means of jet or thrust producing power plant (not shown) out into the wake region behind the profile as shown by arrows. Air may also be drawn in through openings 53, also shown by arrows, to be conducted into the wake region. In this form of the invention a thin jet, compared with the profile tail cross section, completely fills the tail cross section with the exhaust gases and air. The thrust jet itself acts as an injector pump.

Figure 8:
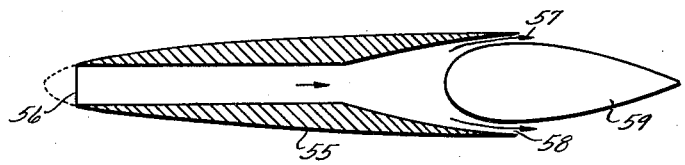

In Fig. 8 the air is received within the profile 55 in a duct opening 56 and conducted by thrust power producing means (not shown) to the wake through small passages 57, 58 that are formed by the trailing edges of the profile 55 and a small profile 59 in the exhaust opening, the trailing edge of which is sharp.

Figure 9:
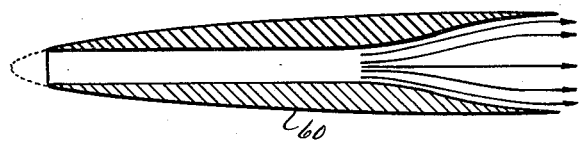
Figure 10:
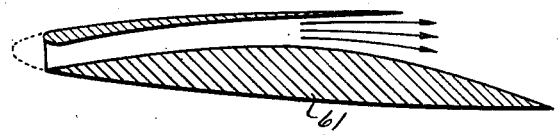

In Figs. 9 and 10 the air is received in the profiles 60 and 61, in the same manner as for the profiles of Figs. 7 and 8, and conducted to the wake by thrust power means (not shown). In Fig. 10 the exhaust is admitted from an opening in a step shown at 42 in Fig. 5 to prevent disturbances in the boundary layer over the lower trailing edge corresponding to 43 in Fig. 5.

Figure 11:
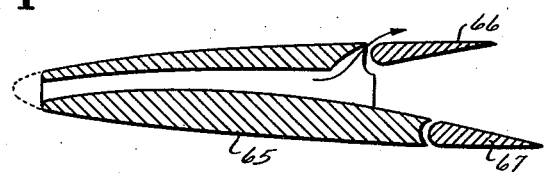

In Fig. 11 the exhaust gases of the profile 65 are blown out between upper and lower flaps 66 and 67 which can be moved the same way, towards each other, or away from each other. The exhaust air can also be regulated by means of these flaps. At certain adjustment points of the flaps part of the air flows through the slot in front of the upper flap. This increases the effectiveness of the upper flap.

The most important advantage attained by applying this invention is that the part of the conventional profile, which is subjected to the disturbance effects occurring behind shock waves and sonic pressure waves, is cut off. Due to the small amount of curvature in the contours of the new profile, sonic waves occur only near its tail end. Shock waves, depending on the shape of the profile, will probably not occur on the profile itself at all but in the flow behind it.

Shock waves which characterize flow conditions in supersonic flight are Mach waves which originate at the nose of a body in a flow. Their angle against the flow direction is determined by the Mach number.

Figure 3:
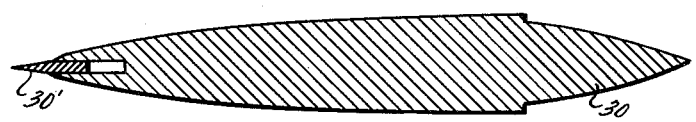
Fig. 3 shows the profile of Fig. 2 with an extension to influence the wake in a further reduction of drag.
Figure 4:
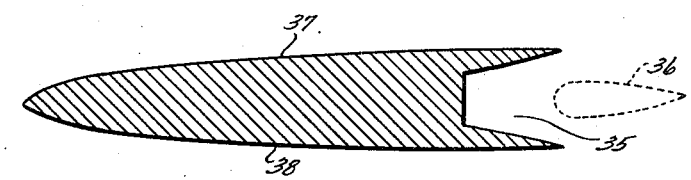
Fig. 4 shows a cross-sectional view of a modified form of profile in which the laminar surfaces are extended to form a recess in which a turbulent control surface may be mounted to stabilize turbulent wake.

The amount of drag of a body in the supersonic flow depends principally on the shape of the front part of the nose. A thick nose, such as that of a normal subsonic profile, having its greatest thickness at the front of the chord, which is true even in thin profiles, causes a large amount of drag. Small amounts of drag are attained only when the opening angle is small; i. e., in an extreme case it would be a sharp, slender point. As shown in Figs. 1, 2, and 3 a spear-like and knife-like device 20', 25', or 30' can be extended or retracted inside the nose of the profile. This will serve the same purpose as if the nose of the profile itself came to a fine point. Obviously such spear-like or knife-like devices may be utilized on the other forms of the invention for supersonic speeds.

This invention may be applied to the profiles of other devices such as propellers and, especially, airfoils and radially symmetric bodies; and the thrust producing plants may be rocket engines in which air is not needed for combustion since the rocket propellant itself contains oxygen.

Fig. 12 shows a conventional manner of mounting a propulsion power plant to an airfoil. The installation of engines on the airfoils in this manner is disadvantageous from the standpoint of drag. It may be seen that retarded flow areas occur near the intersection line of two bodies that diminish toward the rear. The flow diverges from the surface of the body in this area and a great amount of drag originates here. Tests in high speed wind tunnels have shown that when nacelles are mounted on the wings, interference drag varies with the position of the nacelle on the wing. The only known manner of reducing the large amount of interference drag, other than by this invention, is by installing the nacelles far in front or far in the rear of the wing. However, this method can not be applied. If bodies in a flow are united in such a manner that parts having retarded flow are joined with parts having accelerated flow, compensation of the disturbance effects take place which considerably reduces interference drag. This construction is illustrated in Fig. 13. However, the airfoil drag can be almost entirely eliminated by placing the propulsion power plants in the fuselage as shown in Fig. 15. This means that full advantage can be taken of the newest development in high speed planes which is the swept-back wing. Any installation jutting out of swept-back wings partly or entirely counteracts their ability to reduce the effect of drag. As shown in Fig. 15, thrust power means 70 and 71 are arranged in the fuselage profile in a manner to conduct flow energy over the full cross sectional area, or most of the cross sectional area, of the trailing end of the fuselage to prevent the formation of a wake behind the laminar surface in accordance with this invention. The fuselage 73 is cut off at 74 at the thickest point such that the laminar flow along fuselage 73 can not break into turbulent flow at any point.

From the foregoing it may be understood that the disclosed profiles are developments for high subsonic speeds which permit the transition through the transonic and into the supersonic speeds. It is to be understood that other modifications may readily suggest themselves which will not be a departure from the spirit and scope of this invention and I desire to be limited only by the scope of the appended claims.

I claim:

1. A flow profile for aerial flight having low drag and suitable for subsonic and supersonic speeds comprising, a flow profile body member having a forward leading end and a trailing end with a smooth upper laminar flow surface and a smooth lower laminar flow surface diverging rearwardly from the forward leading end, each laminar flow surface terminating in a trailing end with a sharp trailing edge at the thickest part of the chord, said lower laminar flow surface being longer and extending farther rearwardly than said upper laminar flow surface, and a flow passage through said flow profile body member entering at said forward leading end and exhausting into the wake area at said trailing end between said laminar flow surface sharp trailing edges, said laminar flow surfaces each forming a substantially sharp leading edge with said flow passage on said forward leading end of the profile body member and the exhausting end of said flow passage forming a smooth laminar flow surface with the trailing end to said sharp trailing edges of each said lower and upper laminar flow surfaces whereby ram air flows through said flow profile body member flow passage to stabilize the evacuated wake following the trailing end of the flow profile body member during flight.

2. A flow profile as set forth in claim 1 wherein the trailing ends of said laminar flow surfaces terminating in sharp trailing edges are adjustable flaps for controlling the flow into the wake area, said adjustable flaps normally being held in a position in which the laminar flow surfaces of which they form a part are in alignment.

3. A flow profile as set forth in claim 1 wherein the flow profile body member portion between said flow passage and said lower laminar flow surface is double convex.

4. A flow profile for aerial flight having low drag and suitable for subsonic and supersonic speeds comprising, a flow profile body member having a leading end and a trailing end with a smooth upper laminar flow surface and a smooth lower laminar flow surface diverging rearwardly from the leading end to the trailing end at the thickest part of the chord, each laminar flow surface terminating in an adjustable flap with a sharp trailing edge, and said lower laminar flow surface being longer and extending farther rearwardly than said upper laminar flow surface, and a flow passage through said flow profile body member entering at said leading end and exhausting into the wake area at said trailing end between said adjustable flaps, each laminar flow surface forming a substantially sharp leading edge with said flow passage on said leading end of said profile body member and the exhausting end of said flow passage forming a smooth laminar flow surface with said adjustable flaps when the external laminar flow surface thereof is in alignment with the corresponding lower and upper laminar flow surfaces whereby the flow characteristics over said lower and upper laminar flow surfaces and through said flow passage are controlled into said wake area.

5. A flow profile as set forth in claim 4 wherein said lower and upper laminar flow surfaces are convex.

6. A flow profile as set forth in claim 4 wherein the flow profile body member portion formed by said flow passage and said lower laminar flow surface is double convex.

THEODOR WILHELM ZOBEL.

REFERENCES CITED

The following references are of record in the file of this patent:

UNITED STATES PATENTS

| Number | Name | Date |
|---|---|---|
| 1,361,277 | Mott | Dec. 7, 1920 |
| 1,559,091 | Hall | Oct. 27, 1925 |
| 1,631,259 | Gilmore | June 7, 1927 |
| 1,742,910 | Grinoch et al. | Jan. 7, 1930 |
| 1,744,889 | Hammons | Jan. 28, 1930 |
| 1,793,702 | Ksoll | Feb. 24, 1931 |
| 1,962,390 | Gerdes | June 12, 1934 |
| 2,357,680 | Molloy | Sept. 5, 1944 |
| 2,408,788 | Ludington et al. | Oct. 8, 1946 |

FOREIGN PATENTS

| Number | Country | Date |
|---|---|---|
| 525,666 | Great Britain | Sept. 2, 1940 |